(12) United States Patent
Dommert et al.

(10) Patent No.: US 7,249,641 B2
(45) Date of Patent: Jul. 31, 2007

(54) CRAWLER TYPE TRAVELING APPARATUS AND PIVOT SHAFT

(75) Inventors: Karl R. Dommert, Chattanooga, TN (US); James Franks, Ringgold, GA (US)

(73) Assignee: Komatsu Ltd., Tokyo (JP)

( * ) Notice: Subject to any disclaimer, the term of this patent is extended or adjusted under 35 U.S.C. 154(b) by 453 days.

(21) Appl. No.: 10/990,520

(22) Filed: Nov. 18, 2004

(65) Prior Publication Data
US 2006/0103235 A1 May 18, 2006

Related U.S. Application Data

(63) Continuation-in-part of application No. 10/714,933, filed on Nov. 18, 2003, now abandoned.

(51) Int. Cl.
*B62D 55/00* (2006.01)
(52) U.S. Cl. ....................... 180/9.1; 180/9.46
(58) Field of Classification Search ............... 180/9.1, 180/9.21, 9.46; 91/499
See application file for complete search history.

(56) References Cited

U.S. PATENT DOCUMENTS

| 4,126,994 A | 11/1978 | Rockwell |
| 4,577,714 A | 3/1986 | Tokunaga |
| 4,834,478 A | 5/1989 | Stevens et al. |
| 4,988,329 A | 1/1991 | Lammers |
| 5,927,413 A | 7/1999 | Miyaki et al. |
| 6,679,570 B2 | 1/2004 | Kamikawa |
| 2002/0113433 A1* | 8/2002 | Soga et al. ............ 285/61 |
| 2004/0045747 A1* | 3/2004 | Albright et al. ........ 180/9.1 |
| 2005/0126055 A1* | 6/2005 | Dommert et al. ....... 37/348 |

FOREIGN PATENT DOCUMENTS

| JP | 2-113585 | 9/1990 |
| JP | 10-44797 | 2/1998 |
| JP | 10-045053 | 2/1998 |
| JP | 10-045053 A | 2/1998 |
| JP | 2001-171567 | 6/2001 |
| JP | 2001-171567 A | 6/2001 |

(Continued)

OTHER PUBLICATIONS

Liebherr Co. (Liebherr-Export A.G.) PR712 Type, Operation and Maintenance Manual PR712, Litronic, Germany, P.O. Box 54, CH-5415, Nussbaumen, Manual No. IRM-710-06, P-2-6. (four pages).

(Continued)

*Primary Examiner*—Tony Winner
(74) *Attorney, Agent, or Firm*—Posz Law Group, PLC; R. Eugene Varndell, Jr.

(57) ABSTRACT

The crawler type traveling apparatus 5 includes a pivot shaft 6 provided on a vehicle body having a hydraulic source in a protruding state, a track frame 51 rocking around and pivotably supported against this pivot shaft 6, a final reduction gear 53 including a sprocket 531 engaged by a crawler 56 and provided at an end part of this track frame 51, and a hydraulic motor 57 for driving the sprocket 531 of the final reduction gear 53 for rotation, in which the hydraulic motor 57 is provided on a vehicle inner side with respect to the final reduction gear 53.

7 Claims, 7 Drawing Sheets

FOREIGN PATENT DOCUMENTS

| | | |
|---|---|---|
| JP | 2001-225770 | 8/2001 |
| JP | 2001-225770 A | 8/2001 |
| JP | 2002-249084 | 9/2002 |
| JP | 2002-249084 A | 9/2002 |
| JP | 2004-106758 | 4/2004 |
| JP | 2004-114811 | 4/2004 |

OTHER PUBLICATIONS

Liebherr Co. (Liebherr-Export A.G.) PR712 Type, Operation and Maintenance Manual PR712/712M/712L Litronic, Germany, P.O. Box 54, CH-5415, Nussbaumen, P 0-9 (one page).

Liebherr Co. (Liebherr-Export A.G.) PR712L Litronic Ersatzteilliste Spare Parts List, Germany, P.O. Box 54, CH-5415, Nussbaumen, (two pages).

* cited by examiner

CRAWLER TYPE TRAVELING APPARATUS AND PIVOT SHAFT

CROSS-REFERENCE TO RELATED APPLICATION

This application is a continuation-in-part application of U.S. Ser. No. 10/714,933, filed Nov. 18, 2003, now abandoned.

BACKGROUND OF THE INVENTION

1. Field of the Invention

The present invention relates to a crawler type traveling apparatus and a pivot shaft used in a bulldozer, a hydraulic shovel and the like.

2. Description of Related Art

Generally crawler type traveling apparatuses are provided in both right and left sides of a work vehicle such as a bulldozer, a hydraulic shovel, and a crawler crane.

In the work vehicle as described above, the crawler type traveling apparatus has the configuration in which a track frame is provided on a main body of the vehicle and a final reduction gear including a sprocket and a hydraulic motor for driving are provided at an end part of this track frame. A hydraulic source and the hydraulic motor provided on the main body of the vehicle are connected to each other through a hydraulic piping arrangement, and when a hydraulic oil is fed from the hydraulic source, the hydraulic motor starts rotation, and in association with rotation of the hydraulic motor, the sprocket rotates to drive a crawler engaged with the sprocket, and thus the work vehicle starts running. With the configuration as described above, a compact crawler type traveling apparatus can be realized.

Further in a vehicle such as a bulldozer in which a traction is made much of, sometimes pivot shafts are provided in both right and left sides of the vehicle for pivotably supporting crawler type traveling apparatuses respectively, and with this configuration, the crawler type traveling apparatuses in the right and left sides can be contacted to the ground surface having three-dimensional undulations and a large traction can be obtained.

In the crawler type traveling apparatus as described above, by providing pivot shafts in both sides of a main body of the vehicle for pivotably supporting the crawler type traveling apparatuses and also providing a final reduction gear and a hydraulic motor at an end part of the track frame, a compact crawler type traveling apparatus capable of generating a large traction can be realized.

With the configuration, however, as a hydraulic motor is provided on a track frame rocking up and down and further a hydraulic source is provided on a main body of the vehicle, the hydraulic motor and the hydraulic source must be coupled to each other with a piping arrangement such as a hydraulic hose and the like having a predetermined length and high flexibility. In this case, the piping arrangement likely contacts sand, rocks, stones and the like during a work and is likely damaged.

For solving the problem as described above, there has been proposed a structure having a hydraulic frame and a final reduction gear each provided on a track frame rocking up and down, in which a hydraulic passage with the piping arrangement connected thereto is formed in a pivot shaft for making configuration of the piping arrangement compact and also for protecting the piping arrangement from earth and sand, rocks and the like (Refer to, for instance, reference 1: LIEBHERR A. G. "Operation and Maintenance Manual PR712 Litronic", Germany, P.O. Box 54, CH-5415 Nussbaumen, Manual No. IRM-710-06 (pages 2 to 6)).

Further there has been a method of protecting the piping arrangement from earth and sand and rocks by inserting a hydraulic piping connecting a hydraulic motor provided on a track frame rocking up and down to a hydraulic source provided on a main body of the vehicle into a hollow pivot shaft (Refer to, for instance, reference 2: Japanese Utility Model Laid-Open No. HEI 2-113585, pages 3 to 5, FIG. 1)).

The technology disclosed in reference numeral 1 will be described as a related art with reference to the related drawings. It is to be noted that the FIG. 6 is a side view showing a bulldozer having a crawler type traveling apparatus according to the related art, and FIG. 7 is a sectional view showing a principle portion of the crawler type traveling apparatus.

A bulldozer 100 includes a main frame 101 elongated in the longitudinal direction provided at a center thereof, and pivot shafts 102 are provided in the right and left side of this main frame 101 so as to protrude from the main frame 101. Further, a crawler type traveling apparatus 110 is pivotably provided to the pivot shaft 102, in a manner that it can oscillate around the pivot shaft axis P2.

The crawler type traveling apparatus 110 includes a track frame 111, an idler 112, a sprocket 113, a track roller 114, a carrier roller 115, and a crawler 116.

The track frame 111 includes a steel-made frame long in the longitudinal direction like the main frame 101, and is pivotably supported on the pivot shaft 102.

The idler 112 is an idle wheel rotatably provided at a front end part of the track frame 111, and the sprocket 113 is a portion of a final reduction gear (not shown) provided at a rear end part of the track frame 111, and is a driving wheel driven by a hydraulic motor described hereinafter.

The plurality of track rollers 114 are rotatably provided under the track frame 111 respectively, while the carrier roller 115 is rotatably provided above the track frame 111.

The crawler 116 is wound around the idler 112, sprocket 113, track roller 114, and carrier roller 115, and engages the sprocket 113.

When the sprocket 113 is rotated by a hydraulic motor for driving, the crawler 116 moves along an orbit outer from the idler 112, track roller 114, and carrier roller 115 and kicks the ground with a grounding surface to move forward and backward.

A boss portion 121 is provided on the rear side of the track frame 111 as shown in FIG. 7, and the boss portion 121 is rotatably inserted to the pivot shaft 102.

Further a bracket portion 122 extending toward a rear edge side of the track frame 111 is monolithically formed on the boss portion 121, and a final reduction gear 123 including the sprocket 113 is attached to an inner side surface of the bracket portion 122, while a hydraulic motor 124 for driving is attached to an outer side surface of the bracket portion 122.

The pivot shaft 102 is tightened to a side plate 103 of the main frame 101 with a bolt 104 so as to penetrate the main frame 101 from the inside to the outside thereof.

A plurality of hydraulic passages 125, 126, 127, 128 each extending from inside of the vehicle to the outside thereof along the shaft center P2 are formed at a axial center portion of the pivot shaft 102, and a gallery block 129 is attached to an outer end face of the pivot shaft 102.

Connected to this gallery block 129 are a pair of hydraulic hoses 130, 131 extending in parallel to each other. Tips of these hydraulic hoses 130, 131 are connected to a suction port and a discharge port not shown of the hydraulic motor 124, and the base end is connected to the gallery block 129.

The suction port and discharge port of the hydraulic motor 124 are communicated via the hydraulic hoses 130, 131 and gallery block 129 to the hydraulic passages 125, 126 inside the pivot shaft 102, and the hydraulic hoses 105, 106 connected to a suction port and an discharge port of a hydraulic pump disposed inside the main frame 101 and not shown are connected to the hydraulic passages 125, 126.

Further connected to the gallery block 129 are hydraulic hoses 132, 133 with a tip of the hydraulic hose 132 connected to a speed control port (not shown) of the hydraulic motor 124 and the hydraulic hose 133 connected to a brake release port (not shown) of a parking brake 123A of the final reduction gear 123. These hydraulic houses 132, 133 are communicated via the gallery block 129 to the hydraulic passages 127, 128 in the pivot shaft 102, and further the hydraulic hoses 107, 108 connected to an operation valve (not shown) provided inside the main frame 101 are connected to the hydraulic passages 127, 128.

An outer side of the bracket portion 122 is covered with a cover 134, and the hydraulic hoses 130 to 133 and the gallery block 129 are protected by this cover 134.

In the configuration of the crawler type traveling apparatus 110 as described above, the hydraulic motor 124 is first provided outside the vehicle in the bracket portion 122 at a rear edge of the track frame 111. On the other hand, required ports of hydraulic appliances such as a hydraulic pump inside the main frame 101 are communicated via the hydraulic passages 125 to 128 in the pivot shaft 102 to the gallery block 129 attached to an outer end face of the pivot shaft 102, and further the gallery block 129 and the hydraulic motor 124 are connected to each other with short hydraulic hoses 130 to 133, so that configuration of the crawler type traveling apparatus is compact.

The crawler type traveling apparatus 110 described in reference document 1 has, however, the problems as described below because the hydraulic motor 124 is on the more outer side of the vehicle body as compared to the final reduction gear 123 including the sprocket 113.

(1) An outer side surface of the crawler type traveling apparatus 110 often contacts obstacles such as surrounding ground or pavement when moving forward and backward or turning, and further often impinges against rolling rocks from a mucking mound and/or rolling rocks from a wall surface of a bench-cut. For this reason, the hydraulic motor 124, hydraulic hoses 130 to 133 provided on an outer side surface of the crawler type traveling apparatus 110 are often damaged even when the components are covered with the cover 134.

(2) The depth of each of the hydraulic passages 125 to 128 formed in the pivot shaft 102 must be great so as to reach the inside of a side plate 103 from the outer end face of the pivot shaft 102 to. Therefore, specific machines such as, a gun drill and extended machining time are necessary for forming the hydraulic passages 125 to 128.

SUMMARY OF THE INVENTION

An object of the present invention is to provide compact crawler type traveling apparatus and a pivot shaft which can be produced with low cost and insure high reliability in operations.

A crawler type traveling apparatus according to a first invention includes:

a pivot shaft provided on a vehicle body having a hydraulic source in a protruding manner;

a track frame pivotably supported on this pivot shaft;

a final reduction gear having a sprocket engaged by a crawler and provided at an end part of the track frame; and a hydraulic motor provided on the track frame for driving the sprocket of the final reduction gear for rotation, in which the hydraulic motor is provided at a position closer to the main frame constituting a main body of the vehicle as compared to the final reduction gear.

The crawler type traveling apparatus according to a second invention includes in addition to the components in the crawler type traveling apparatus according to the first invention;

a hydraulic passage including a passage formed in an axial direction of the pivot shaft for communicating inside and outside of the vehicle body with inside of the vehicle body coupled thereto via the hydraulic source and a piping arrangement and also with outside of the vehicle body coupled thereto via the hydraulic motor and the piping arrangement, in which an outer connection port that communicates to the passage extending along the axial direction and opens on a peripheral surface around the shaft outside the vehicle body with a piping arrangement for coupling the hydraulic motor connected thereto is connected to the pivot shaft.

The crawler type traveling apparatus according to a third invention includes, in addition to the components in the second invention, an inner connection port that communicates to the passage along the axial direction, opens on a peripheral surface around the shaft inside the vehicle body with the piping arrangement for coupling the hydraulic source connected thereto is formed in the pivot shaft.

A pivot shaft according to a fourth invention is a pivot shaft for pivotably supporting a track frame constituting a crawler type traveling apparatus against the vehicle body, the pivot shaft including:

a passage formed in the axial direction of the shaft so that inside and outside of the vehicle body are communicated to each other when set in the vehicle body; and a first connection port that communicates to the passage extending along the axial direction and opens on a peripheral surface around the shaft outside the vehicle body when set on an auxiliary vehicle carrier belt with a piping arrangement to a hydraulic motor provided on the track frame connected thereto.

The pivot shaft according to a fifth invention includes: in addition to the components in the fourth invention, a flange section fixed to the main frame constituting the vehicle body; and a supporting section for pivotably supporting the track frame, in which the first connection port is provided between the flange section and the supporting section.

The pivot shaft according to a sixth invention includes: in addition to the components in the fourth invention or in the fifth invention, a second connection port that communicates to the passage extending along the axial direction and formed so that the port opens on a peripheral surface around the shaft inside the vehicle body when set on the vehicle body with a piping arrangement to a hydraulic motor provided on the vehicle body connected thereto.

In the pivot shaft according to a seventh invention, in addition to the features according to the fourth invention to the sixth invention, a peripheral surface around the pivot shat with the first connection port and/or the second connection port formed thereon is a flat surface normal to the connecting direction of the piping arrangement.

With the first invention, a rigid final reduction gear is provided on an outer side surface of the crawler type traveling apparatus, and a hydraulic motor and a piping arrangement connected to the hydraulic motor for supplying a hydraulic pressure are provided at a position closer to the main frame as compared to the final reduction gear, so that the hydraulic motor and the piping arrangement do not contact the ground or pavements while the crawler type traveling apparatus is operating, and further stones falling from a mucking mound and/or a wall surface of a bench-cut never collide with the hydraulic motor nor the piping arrangement. Therefore the crawler type traveling apparatus has high reliability in operation.

With the second invention, in addition to the effects and advantages provided by the first invention, by forming the passage along the axial direction in the pivot shaft and also forming an external connection port on a side face around the shaft, the hydraulic passage extending along the axial direction of the pivot shaft can be shortened, to connected with the short hydraulic passage, which allows realization of a compact crawler type traveling apparatus.

With the third invention, as the hydraulic passage can further be shortened by forming an inner connection port on a side face around the shaft, the pipe length can be made further shorter, which allows further size reduction of the crawler type traveling apparatus.

With the fourth to sixth inventions, by applying the pivot shaft according to the invention to a crawler shaft, the effects and advantages similar to those provided by the first invention can be provided. Also when forming a passage extending along the axial direction in the pivot shaft, precise machining as that described in the cited reference 1 is not required, so that the pivot shaft can be manufactured with the low production cost.

With the seventh invention, the piping arrangement having simple configuration can tightly be connected to a connection port by making the surface around the pivot shaft with the connection port formed thereon flat and normal to the connecting direction of the piping arrangement, which allows further size reduction of a crawler type traveling apparatus and makes it difficult for the piping arrangement to be off from the connection port, and therefore the reliability in operation is further improved.

DETAILED DESCRIPTION OF PREFERRED EMBODIMENT(S)

An embodiment of the present invention is described with reference to the related drawings.

(1) General Configuration

Figure 1:
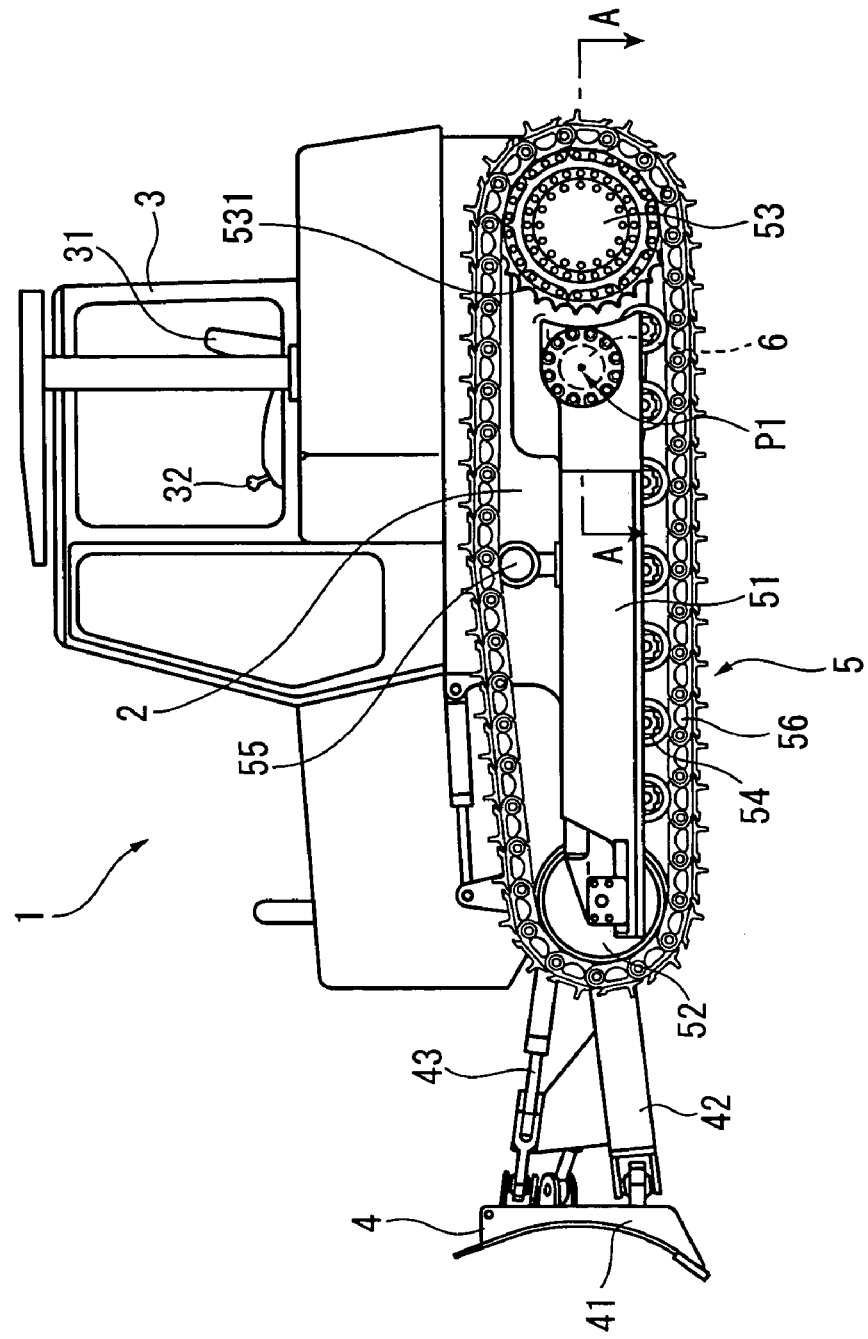
FIG. 1 is a side view showing a work vehicle having the crawler type traveling apparatus according to an embodiment of the present invention.

FIG. 1 shows a bulldozer 1 according to an embodiment of the present invention, and this bulldozer 1 include a main frame 2, a cabin 3, a blade 4, and a crawler type traveling apparatus 5.

The main frame 2 includes a steel-made frame body extending in the longitudinal direction along the running direction, and includes an engine as a driving power source, a hydraulic pump driven by the engine and the like although not shown.

The cabin 3 is provided in the rear upper section of the main frame 2 with a seat 31 and an operation lever 32 provided inside thereof, and an operator operates the bulldozer 1 climbing into the cabin 3 and sitting on the seat 31 by operating the operation lever 32 and the like.

In the present invention, the vehicle body including the main frame 2, cabin 3, the not-shown engine, hydraulic pump and the like.

The blade 4 is provided in the front section of the bulldozer 1 in its running direction, and includes a blade body 41, a frame 42, and a cylinder 43.

The blade body 41 includes a steel plate sheet having a curved concave surface, and by pushing earth with this blade body 41, such works as digging and banking can be carried out, and further such work as leveling the ground can be carried out with a lower surface of the blade body 41.

The frame 42 is used for coupling the blade body 41 to the main frame 2, and is rotatably attached to the main frame 2 with the blade body 41 attached to a tip thereof so that the blade body 41 can freely be rotated up and down and in the horizontal direction.

The cylinder 43 is attached to an upper section of the main frame 2 with the tip side coupled to an upper section of the blade body 41. This cylinder 43 is extended or shrunk by a hydraulic oil fed from the hydraulic pump in the pressurized state, and can change an elevation angle of the blade body 41 thereby.

[2] Structure of Crawler Type Traveling Apparatus 5

(2-1) Appearance

The crawler type traveling apparatuses 5 are provided on both sides under the main frame 2 so that the crawler type traveling apparatuses 5 can freely rotate around a shaft center P1 against the main frame 2 via a pivot shaft 6 provided at a substantially central position of the main frame 2 in a protruding manner.

This crawler type traveling apparatus 5 includes a track frame 51, an idler 52, a final reduction gear 53, a track roller 54, a carrier roller 55, and a crawler 56.

The track frame 51 includes a steel-made frame extending in the longitudinal direction like the main frame 2, and is pivotably supported by the pivot shaft 6.

The idler 52 is rotatably provided at a front end part of the track frame 51, and can be moved forward by an idler cushion not shown against the track frame 51.

The final reduction gear 53 is provided at a rear end part of the track frame 51, and includes a sprocket 531 with crawler 56 engaging therein and exposed in an outer periphery of the reduction gear main body, and a hydraulic motor for driving the final reduction gear 53 is provided inside the final reduction gear 53 although the details are described hereinafter.

A plurality of track rollers 54 are rotatably provided under the track frame 51, and each of the track rollers 54 is arranged along the running direction of the bulldozer 1.

The carrier roller 55 is rotatably provided above the track frame 51.

Although not shown, the crawler 56 has the configuration in which a plurality of shoe plates coupled to each other with pins, and is wound around the idler 52, sprocket 531, a plurality of track rollers 54, and carrier roller 55, and further engages the sprocket 531.

(2-2) Internal Structure

Figure 2:
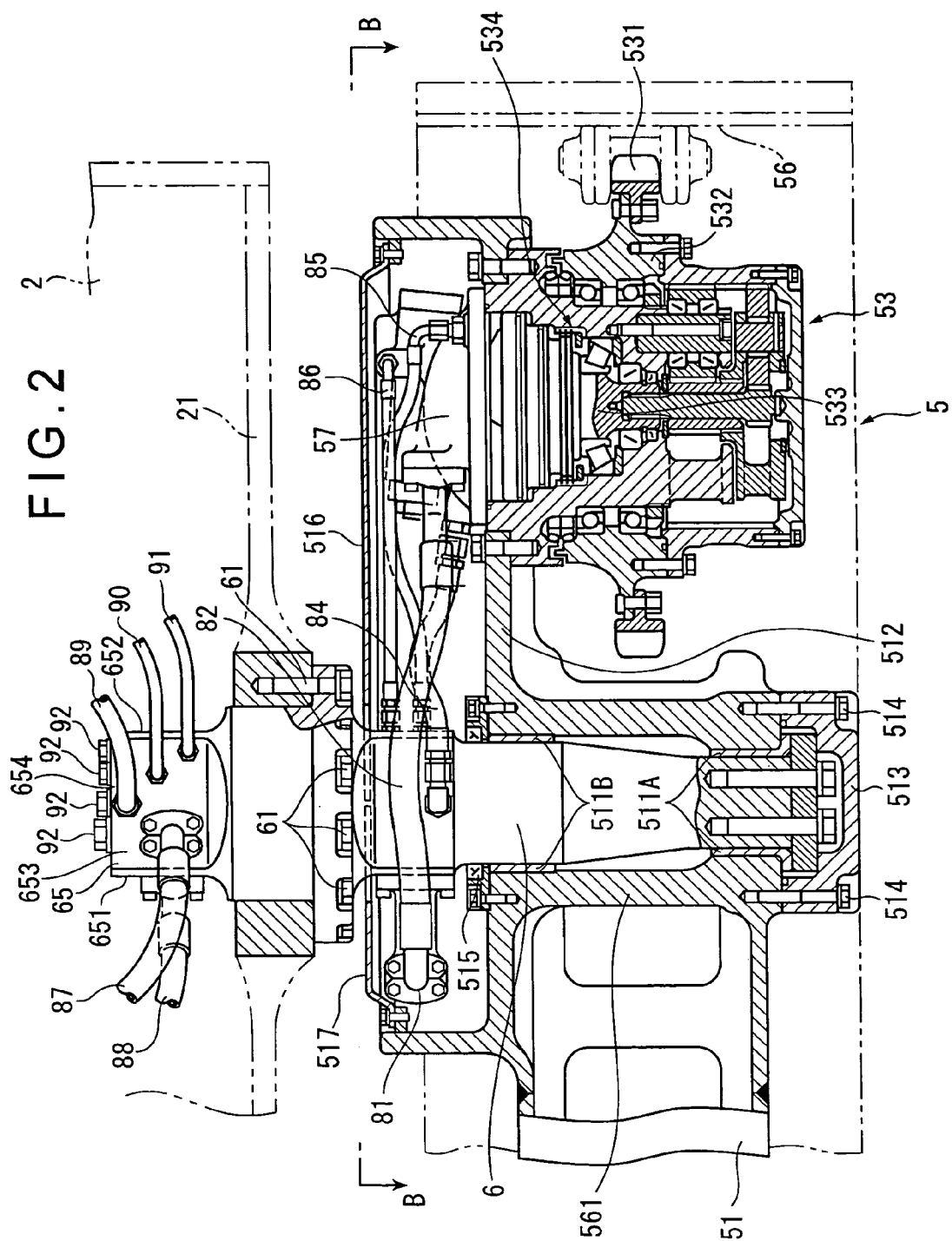
FIG. 2 is a horizontal sectional view taken along the line A-A in FIG. 1 showing the embodiment.

FIG. 2 is a sectional view taken along he line A-A in FIG. 1, and to describe more in detail the internal structure of the crawler type traveling apparatus 5 having the appearance as described above, the pivot shaft 6 penetrates a side plate 21 of the main frame 2 and is fixed to the side plate 21 with a plurality of bolts 61, and further the track frame 51 is pivotably provided on the outer protruding section.

The track frame 51 includes a boss portion 511 formed at a position close to the rear end part, and a bracket portion 512 formed at a position further close to the rear end part as compared to the boss portion 511.

The boss portion 511 has a substantially cylindrical hole extending in the direction orthogonal to the extending direction of the track frame 51, and the outer protruding section of the pivot shaft 6 is inserted into this portion. Provided in the boss portion 511 are bushes 511A, 511B, and the crawler type traveling apparatus 5 is pivotably supported on the pivot shaft 6 with the bushes 511A, 511B.

A tip section of the pivot shaft 6 in the protruding direction is covered with a cover member 513, and this cover member 513 is tightly fixed to the track frame 51 with a bolt 514.

Further a seal section 515 is formed on a base end section at a position outer from the side plate 21 of the pivot shaft 6, and a lubrication oil is included in a clearance in the boss portion 511 between the cover member 513 and the seal section 515 so that the track frame 51 can pivot against the pivot shaft 6.

Although not shown in FIG. 2, the bracket 512 includes a supporting section for supporting the final reduction gear 53 and a hydraulic motor 57 as a driving power source, and a rib surrounding an outer periphery of this supporting member. Provided on an outer side surface of this bracket 512 is the final reduction gear 53, and also provided on an inner side surface of the bracket 512 is the hydraulic motor 57. The hydraulic motor 57 is attached to the track frame 51 and is provided inside the final reduction gear 53.

The inner side surface with the hydraulic motor 57 of the bracket 512 provided thereon is covered with the cover members 516, 517 up to the position of the boss portion 511.

The final reduction gear 53 includes a casing 532 and a final reduction gear main body 533, and a sprocket 513 is provided outside a casing 532.

The final reduction gear main body 533 is a portion for driving the sprocket 531 for rotation by reducing a rotating force generated by the hydraulic motor 57, and a brake mechanism 534 for parking is provided in the final reduction gear main body 533.

The hydraulic motor 57 has a rotating shaft driven with a hydraulic oil pressure-fed via an operation valve by a hydraulic pump (not shown) provided inside the main frame 2, and the rotating shaft of the hydraulic motor 57 penetrates the bracket 512 and is connected to gears of the final reduction gear main body 533.

[3] Structure of Pivot Shaft 6

Figure 3:
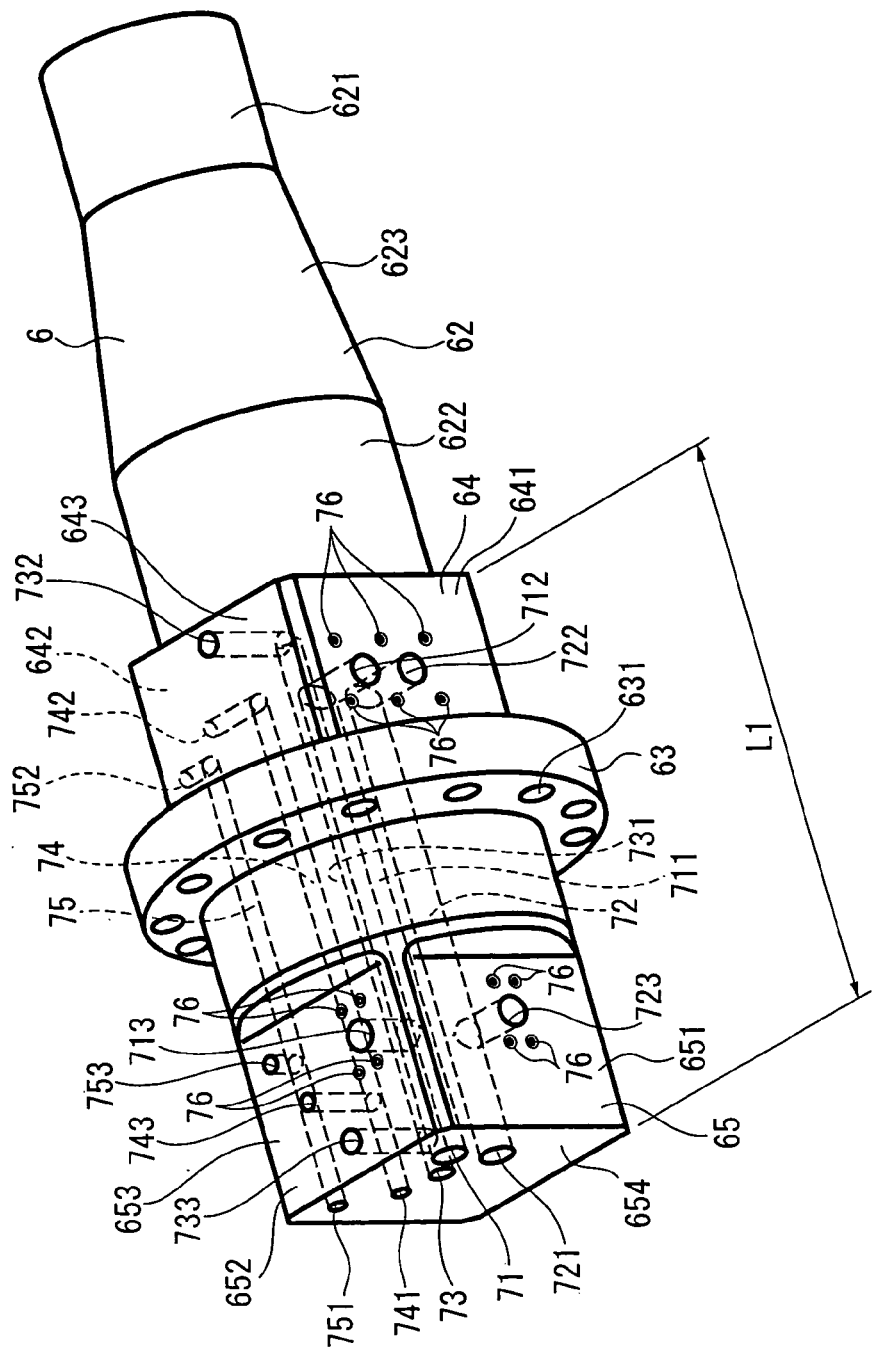
FIG. 3 is a perspective view showing appearance and structure of a pivot shaft for pivotably supporting the crawler type traveling apparatus according to the embodiment.

The pivot shaft 6 has a steel-made shaft-like body and includes a supporting section 62, a flange section 63, and piping connecting sections 64, 65 as shown in FIG. 3.

The supporting section 62 is a section into which the boss portion 511 of the track frame 51 is inserted, a tip section 621 of the supporting section having a cylindrical form and a base end section 622 of the supporting section, and a frustum section 623 formed between the tip section 621 of the supporting section and the base end section 622 of the supporting section with the diameter gradually reduced toward the tip end side.

The flange section 63 is provided around the center of the pivot shaft 6 at a position closer to the base end side as compared to the supporting section 62 in a manner protruding toward the outside, and a plurality of holes 631 are formed on a protruding surface of the flange section 63, and further the bolt 61 for fixing to the side plate 21 of the main frame 2 is inserted into each of the holes 631.

Piping connecting sections 64, 65 are formed at inner and outer sides of the flange section 63, and a piping arrangement for feeding and discharging a hydraulic oil is connected to the section. The piping connecting section 64 is a section to which the piping arrangement leading to the final reduction gear 53 and the hydraulic motor 57 are connected, while the piping connecting section 65 is a section to which the piping arrangement leading to the operation valve, the hydraulic pump and a hydraulic tank are connected.

The piping connecting sections 64, 65 are square poles formed around the center of the pivot shaft 6 and having flat surfaces, and the piping connecting section 64 has side faces 641, 642, an upper surface 643, and a lower surface now shown in FIG. 3, while the piping connecting section 65 has side faces 651, 652, an upper surface 653, a lower surface not shown in FIG. 3, and an end face 654 in the base end side of the pivot shaft 6 in the axial direction.

A plurality of hydraulic passages 71, 72, 73, 74, and 75 for feeding and discharging hydraulic oil to and from the hydraulic motor 57 or the final reduction gear 53 are formed inside the pivot shaft 6 having the form as described above.

The hydraulic passage 71 includes an axially extending passage 711, a first connection port 712, and a second connection port 713.

The axially extending passage 711 is a hole extending along a center of the pivot shaft 6 and is formed with a drill or the like from an end face 654 in the base end side of the piping connecting section 65, and extends up to a substantial center of the piping connecting section 64 provided at an outer position.

The first connection port 712 is formed as a hole extending in the direction orthogonal to the axially extending passage 711 and is opened on a side face 641 of the piping connecting section 64 with the hole tip communicated to the axially extending passage 711.

The second connection port 713 is formed as a hole extending in a direction orthogonal to the axially extending passage 711 like the first connection port 712 and is opened on the upper surface 653 of the piping connecting section 65 with the hole tip communicated to the axially extending passage 711.

The first connection port 712 and the second connection port 713 are formed from a side face 641 of the piping connection section 64 and an upper surface 653 of the piping connecting section 65 with a drill or the like.

The hydraulic passage 72 includes an axially extending passage 721, a first connection port 722, and a second connection port 723 each engraved like the hydraulic passage 71. The second connection port 723 of the hydraulic passage 72 is different from the second connection port 713 of the hydraulic passage 71 in that it is opened on a side face of the piping connecting section 65.

A plurality of male screw holes 76 are formed surrounding an opening section of each of the connection ports 712, 713, 722, 723 of the hydraulic passages 71, 72, and the piping arrangement is attached thereto with bolts screwed into the male screw holes 76 respectively.

The hydraulic passage 73 includes an axially extending path 731 formed substantially in the same manner as hydraulic passage 71 described above a first connection port 732, and a second connection port 733. Of these, the first connection port 732 of the hydraulic passage 73 is different from the first connection port 712 of the hydraulic passage 71 in that it is opened on an upper surface 643 of the piping connecting section 64.

The hydraulic passages 74, 75 include the axially extending paths 741, 751 formed substantially like the hydraulic passage 71 described above, first connection ports 742, 752, and second connection port 743, 753 respectively. Of these, the first ports 742, 752 are different from the first connection port 712 of the hydraulic passage 71 in the point that the ports 742, 752 are opened on a side face 642 of the piping connecting section 64. Namely the first connection ports 742, 752 are opened on the side face 642 opposite to the side face 641 on which the first connection port 712 of the hydraulic passage 71 is opened.

[4] Piping Structure (4-1) Outer Piping Structure

Figure 4:
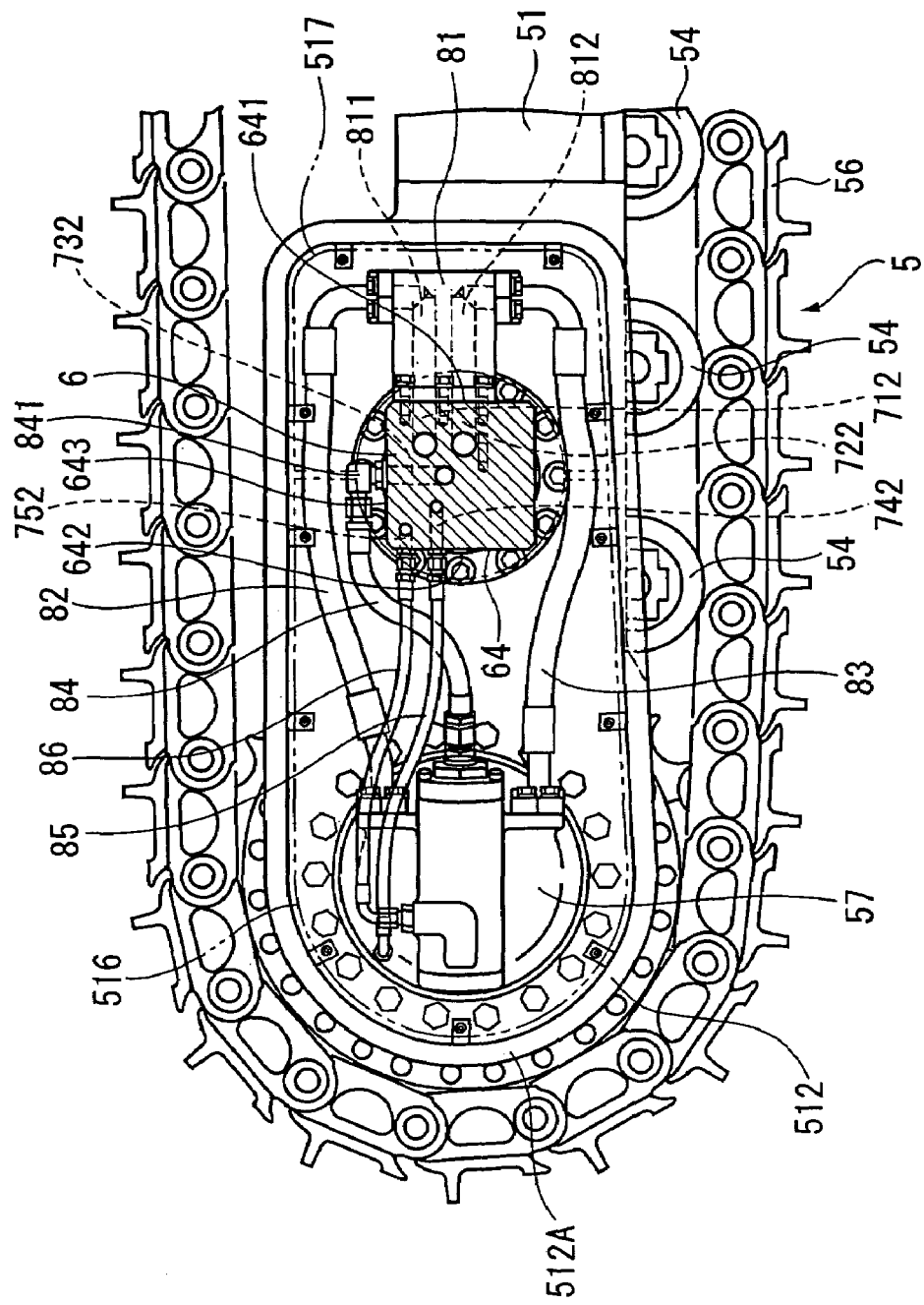
FIG. 4 is a front view showing an outer piping structure viewed along the line B-B in FIG. 2 in the embodiment.
Figure 5:
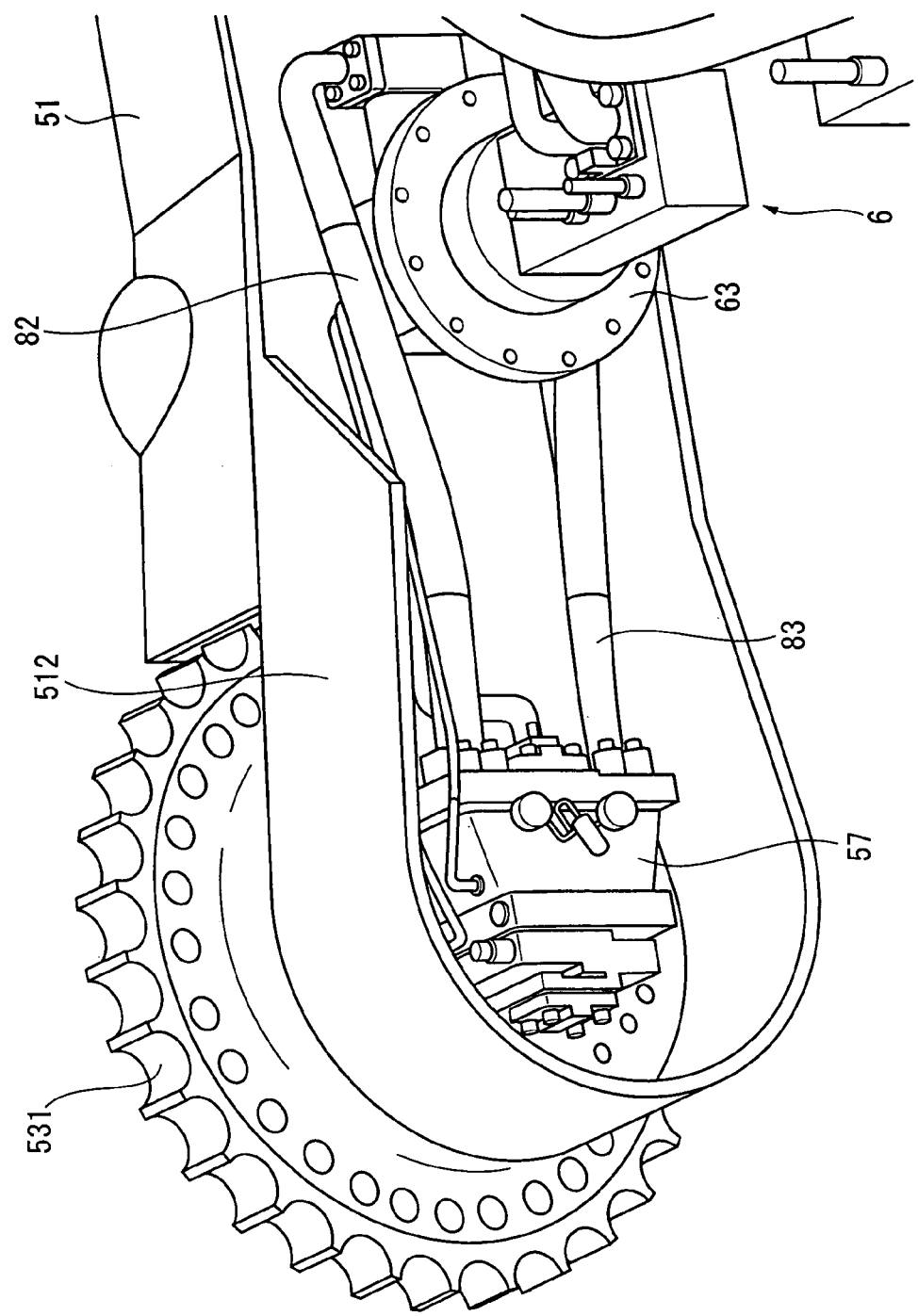
FIG. 5 is a perspective view showing a principle portion of the outer piping structure in the embodiment.
Figure 6:
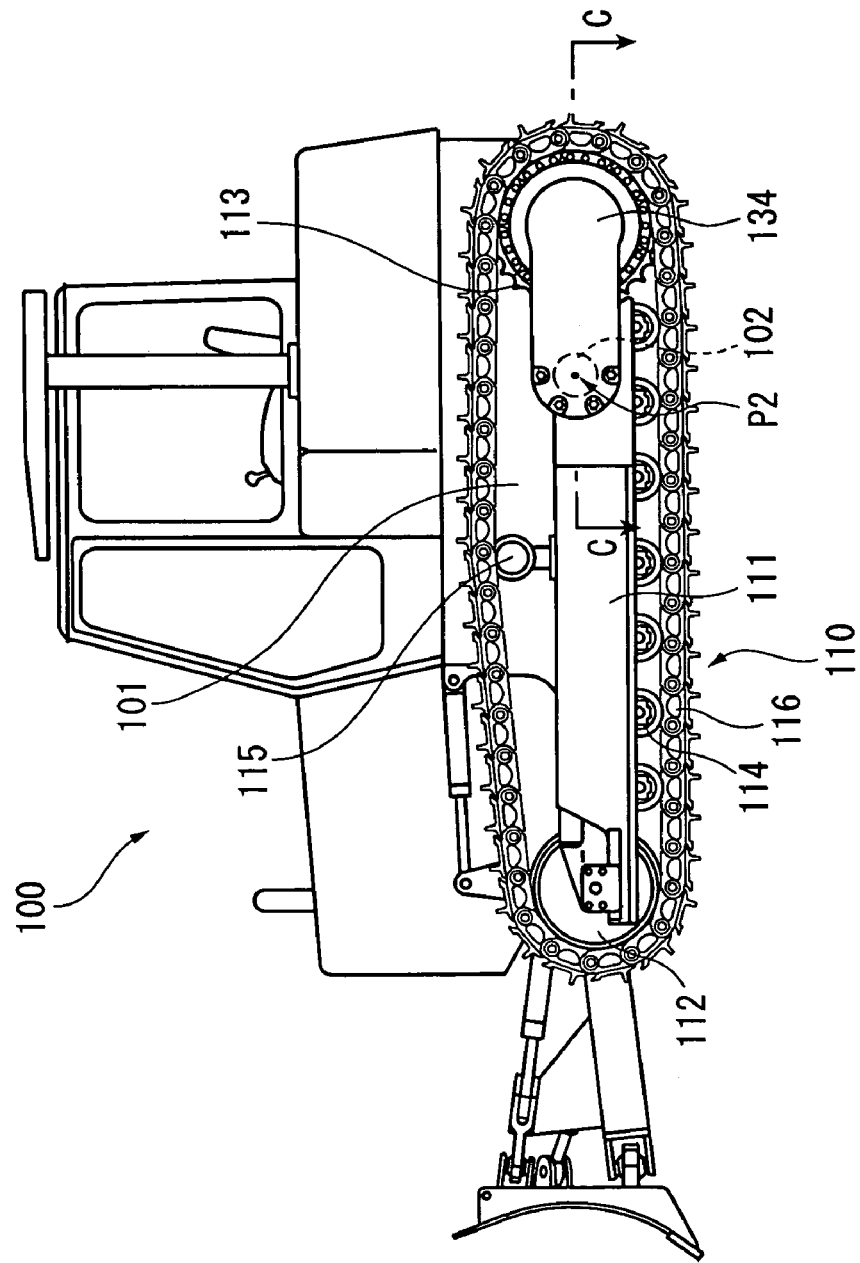
FIG. 6 is a side view showing a work vehicle having a crawler type traveling apparatus according to the prior art.
Figure 7:
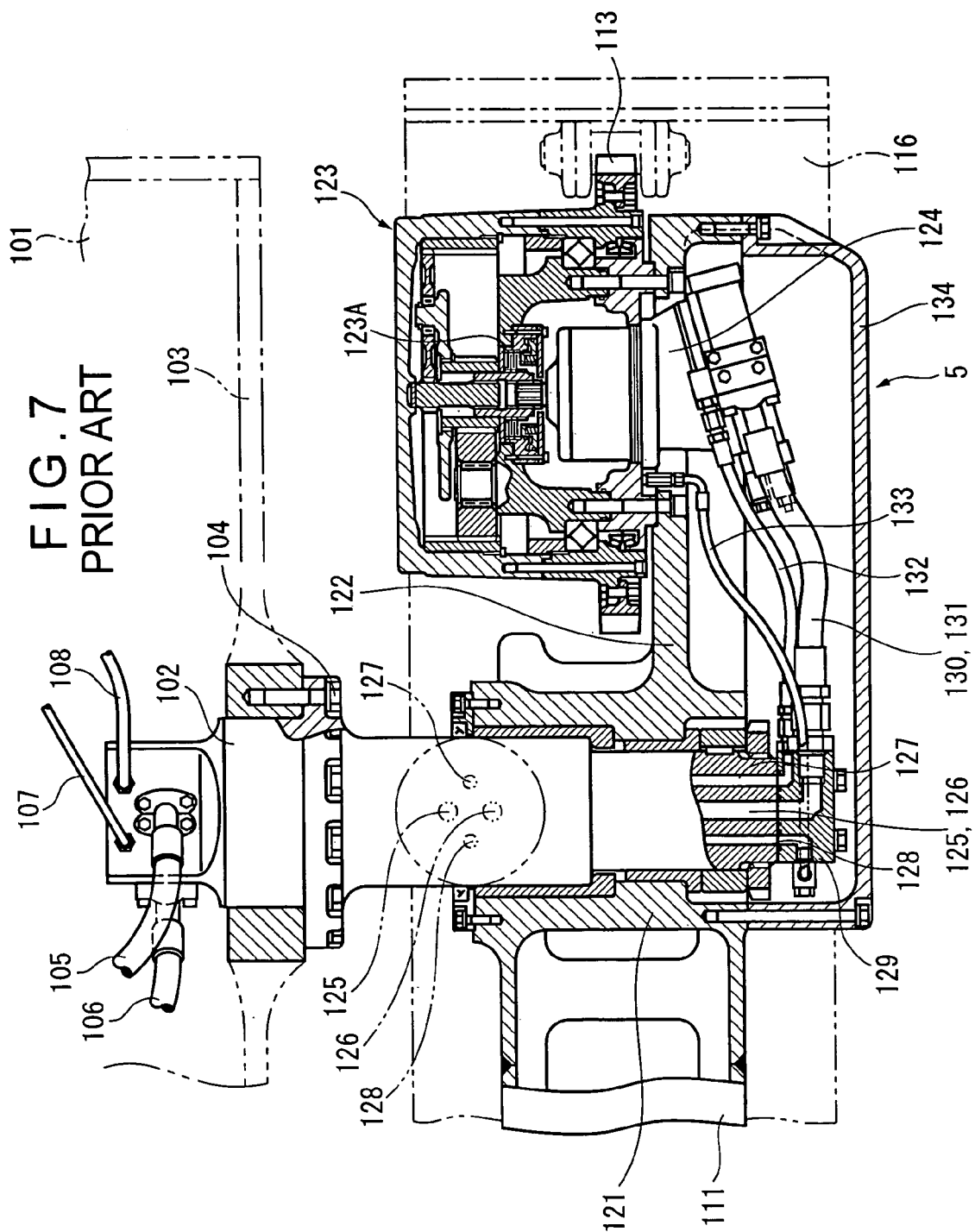
FIG. 7 is a horizontal sectional view taken along the line C-C in FIG. 6.

FIG. 4 shows the outer piping structure of the main frame 2 viewed from an arrow indicated by the line B-B in FIG. 2, while FIG. 5 is a general perspective view showing the outer piping structure.

Various types of piping arrangements are connected to the hydraulic passages 71 to 75 formed inside the pivot shaft 6. The piping arrangement connected to the piping connecting section 64 is connected to the hydraulic motor 57 and the final reduction gear 53 each provided in the track frame 51, while the piping arrangement connected to the piping connecting section 65 is connected to the operation value, the hydraulic oil tank and the like provided inside the main frame 2.

More specifically, as shown in FIG. 4, the pivot shat 6 is provided so that the face with the first connection port 712 of the hydraulic passage 71 and the first connection port 722 of the hydraulic passage 72 opened thereon opposes the opposite side of the hydraulic motor 57, and a gallery block 81 is connected to the first connection ports 712, 722 respectively.

The gallery block 81 has flow paths 811, 812 communicating to the first connection: ports 712, 722 respectively, and the flow path 811 is opened on the upper section, while the flow path 812 is opened on the lower section.

A flexible hydraulic hose 82 is connected to the flow path 811, and a flexible hydraulic hose 83 is connected to the flow path 812.

The hydraulic hose 82 is installed along the inner periphery of the upper side of the bracket 512, while the hydraulic hose 83 is installed along the inner periphery of the lower side of the bracket 512, and are connected to an inlet port and an discharge port of the hydraulic motor 57 although not shown.

The flexible hydraulic hose 84 is connected to the first connection port 732 of the hydraulic passage 73, and flexible hydraulic hoses 85, 86 are connected to the first connection ports 742, 752 of the hydraulic passages 74, 75. The hydraulic hose 84 extends in the horizontal direction via an elbow 841 provided on an upper surface 643 of the piping connecting section 64, and bends in the sigmoid form at an intermediate portion thereof. The hydraulic hoses 85, 86 extend in the substantially horizontal direction from the side face 642 of the piping connecting section 64 opposite to the hydraulic motor 57.

Tips of the hydraulic hoses 84, 85, 86 are respectively connected to a drain port or a speed control port of the hydraulic motor 57 and a brake release port of a brake mechanism 534 provided inside the final reduction gear 53 each not shown for speed control and braking control and the like for the crawler type traveling apparatus 5.

(4-2) Inner Piping Structure

The piping structure inside the main frame 2 includes, as shown in FIG. 2, a plurality of flexible hydraulic hoses connected to the second connection ports formed in the piping connecting section 65 provided on inner side of the side plate of the main frame 2.

A hydraulic hose 87 is connected to the second connection port 713 of the hydraulic passage 71 opened on the upper surface 653 of the piping connecting section 65, and a hydraulic hose 88 is connected to the second connection port 723 (not shown in FIG. 2) of the hydraulic passage 72 opened on the side face 651 of the piping connecting section 65.

Tips of the hydraulic hoses 87, 88 are connected to a discharge port and an inlet port of a hydraulic pump not shown.

A hydraulic hose 89 is connected to the second connection port 733 (not shown in FIG. 2) of the hydraulic passage 73 opening on the upper surface 653 of the piping -connecting section 65, and a tip of this hydraulic hose 89 is connected to a hydraulic oil tank not shown, the hydraulic hose 89 forming a drain conduit.

Hydraulic hoses 90, 91 are connected to the second connection ports 743, 753 (not shown in FIG. 2) opening on the upper surface 653 of the piping connecting section 65, and tips of the hydraulic hoses 90, 91 are connected to operation vales not shown.

Openings on end faces in the base end side of the piping connecting sections 65 for the axially extending passages 711, 721, 731, 741, and 751 (not shown in FIG. 2) are sealed with seal members respectively with bolts 92 screwed therein respectively to prevent leakage of the hydraulic oil from the axially extending passages 711, 721, 731, 741, and 751.

[5] Effects and advantages of embodiment

The crawler type traveling apparatus 5 according to this embodiment has the configuration as described above, and therefore can provide the effects and advantages as described below.

(5-1) The hydraulic motor 57 is arranged at the inner side with respect to the final reduction gear 53, so that the final reduction gear 53 covered with the rigid casing 532 is arranged at the outer side of the crawler type traveling apparatus 5. While the crawler type traveling apparatus 5 operates, the hydraulic motor 57, gallery block 81, and hydraulic hoses 82, 83, 84, 85, 86 arranged at the inner side do not come into contact pavement, and are free from impingement with rolling stones from a the mucking mound and/or from the wall surface of a bench cut.

(5-2) The hydraulic passages 71 to 75 communicating with the hydraulic motor 57, etc are defined inside the pivot shaft 6. Therefore, piping arrangements that are so disposed as to extend from hydraulic appliances arranged inside the side plate 21 of the main frame 2 such as a hydraulic pump toward the hydraulic motor 57 and the like of the crawler type traveling apparatus 5 can be arranged to a position close to the hydraulic motor 57 without being exposed to the outside. Accordingly, the piping configuration that is hardly damaged from the outside can be acquired.

(5-3) As the first connection ports 712, 722, 732, 742, and 752 are formed and opened on an outer peripheral surface around the center of the pivot shaft 6, connection with the hydraulic motor 57 can be realized with short hydraulic hoses 82 to 86. Therefore, extremely compact piping structure can be obtained.

(5-4) The first connection ports 712 to 752 are provided and opened on the side faces 641, 642 as well as the top surface 643 of the piping connecting section 64 around a center of the pivot shaft 6, and further the second connection ports 713, 723, 733, 743, 753 are provided and opened on the side faces 651, 652 as well as on the top surface 653 of the piping connecting section 65, so that it is required only to form the axially extending passages 711, 721, 731, 741, and 751 in the section L1 shown in FIG. 3. Therefore, unlike the pivot shaft disclosed in the reference 1 as the related art, it is not necessary to form the hydraulic passage over the full length thereof in the axial direction. Consequently, the axially extending passages 711 to 751 can be easily extended by an ordinary drill and the like, which enables substantial reduction in machining cost for manufacturing the pivot shaft 6 as well as in production cost for the crawler type traveling apparatus 5.

(5-5) The side faces 641, 642, 652 and top surfaces 643, 653 of the piping connecting sections 64, 65 are flat surfaces normal to the piping connecting direction, so that the gallery block 81 or hydraulic hoses 82 to 91 are tightly connected to the first connection ports 712 to 752 or to the second connection ports 713 to 753 with a simple structure with bolts or plates. Therefore, leakage of a hydraulic oil from the connecting sections or separation of the piping arrangements from the specified positions can be prevented, so that reliability in operations can further be improved.

[6] Variants of the Embodiment

The present invention is not limited t the embodiment described above, and changes and improvements in a scope in which objects of the present invention are achievable are included in a scope of the present invention.

In the embodiment, the crawler type traveling apparatus 5 is employed as a traveling apparatus for the bulldozer 1, but the present invention is not limited to this application, and the present invention may be applied to other types of work vehicles such as a hydraulic shovel or a crawler crane.

In the embodiment described above, the piping connecting sections 64, 65 are square poles each arranged around the center of the pivot shaft 6 and having the flat side faces 641, 642, 651, 652, top surfaces 643, 653, and a lower surface, but the present invention is not limited to this configuration. Namely, the piping connecting section may have a cylindrical form with only a section around a connection port cut and machined to a flat surface.

In addition, other specific structures and forms can be employed for carrying out the present invention within a scope in which objects of the present invention are achievable.

What is claimed is:

1. A crawler traveling apparatus comprising:
   a pivot shaft provided on a vehicle body having a hydraulic source in a protruding state;
   a track frame rocking around and pivotably supported by the pivot shaft
   a final reduction gear including a sprocket engaged by a crawler and provided at an end part of the track frame; and
   a hydraulic motor provided on the track frame for driving a sprocket of the final reduction gear for rotation,
   wherein the hydraulic motor is provided at a position closer to a main frame constituting the vehicle body as compared to the final reduction gear.

2. The crawler traveling apparatus according to claim 1 further comprising:
   a hydraulic passage including a passage formed in the pivot shaft in the axial direction to communicate inside of the vehicle body to outside thereof, thus inside of the vehicle body coupled via a piping arrangement to the hydraulic source and outside of the vehicle body coupled via a piping arrangement to the hydraulic motor,
   wherein an outer connection port communicating to a passage extending along the axial direction and opened on a peripheral surface around a center of a shaft outside the vehicle body with a piping arrangement for coupling the hydraulic motor connected thereto is formed on the pivot shaft.

3. The crawler traveling apparatus according to claim 2,
   wherein an inner connection port communicating to a passage extending along the axial direction and opened on a peripheral surface around the shaft inside the vehicle body with a piping arrangement for coupling the hydraulic source connected thereto is formed on the pivot shaft.

4. A pivot shaft for pivotably supporting a track frame constituting a crawler traveling apparatus against a vehicle body comprising:
   a passage formed in the axial direction of the shaft to communicate inside of the vehicle body to outside thereof when mounted on the vehicle body; and
   a first connection port communicating to a passage extending along the axial direction and formed and opened on a peripheral surface of a center of the shaft outside the vehicle body when mounted on the vehicle body with a piping arrangement for a hydraulic motor provided on the track frame connected thereto.

5. The pivot shaft according to claim 4,
   a flange section fixed to the main frame constituting the vehicle body; and
   a supporting section for pivotably supporting the track frame,
   wherein the first connection port is provided between the flange section and the supporting section.

6. The pivot shaft according to claim 4 further comprising:
   a second connection port communicating to a passage extending along the axial direction, and formed and opened on a peripheral surface around the center of the shaft inside the vehicle body when mounted on the vehicle body with a piping arrangement for a hydraulic source provided on the vehicle body connected thereto.

7. The pivot shaft according to claim 4,
   wherein a peripheral surface around the center of the pivot shaft with the first connection port and/or the second connection port formed thereon is a flat surface normal to the connecting direction of the piping arrangement.

* * * * *